(12) United States Patent
Cong et al.

(10) Patent No.: US 8,570,696 B2
(45) Date of Patent: Oct. 29, 2013

(54) PROTECTION CIRCUIT FOR HARD DISK

(75) Inventors: Wei-Dong Cong, Shenzhen (CN); Guo-Yi Chen, Shenzhen (CN)

(73) Assignees: Hon Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 173 days.

(21) Appl. No.: 13/314,286

(22) Filed: Dec. 8, 2011

(65) Prior Publication Data

US 2013/0100565 A1 Apr. 25, 2013

(30) Foreign Application Priority Data

Oct. 25, 2011 (CN) .......................... 2011 1 0327468

(51) Int. Cl.
*H02H 3/00* (2006.01)
*H02H 3/20* (2006.01)
*H02H 9/04* (2006.01)

(52) U.S. Cl.
USPC ........... 361/86; 361/91.1; 361/91.2; 361/91.5

(58) Field of Classification Search
USPC ........................................................ 361/86
See application file for complete search history.

(56) References Cited

U.S. PATENT DOCUMENTS

| 4,536,699 A * | 8/1985 | Baker | 323/276 |
| 5,404,094 A * | 4/1995 | Green et al. | 323/282 |
| 7,944,661 B2 * | 5/2011 | Kim | 361/90 |
| 8,451,571 B2 * | 5/2013 | Imura et al. | 361/86 |
| 2009/0103219 A1 * | 4/2009 | Tamegai | 361/86 |
| 2009/0212753 A1 * | 8/2009 | Lou | 323/277 |
| 2010/0321845 A1 * | 12/2010 | Imura et al. | 361/86 |
| 2011/0063759 A1 * | 3/2011 | Billingsley et al. | 361/1 |

* cited by examiner

*Primary Examiner* — Dharti Patel
(74) *Attorney, Agent, or Firm* — Altis & Wispro Law Group, Inc.

(57) ABSTRACT

A protection circuit includes a switch circuit, a sample circuit, a comparison circuit, and a relay circuit. The switch circuit is connected between a hard disk power supply and a hard disk to control whether to output power from the hard disk power supply to the hard disk. The sample circuit samples the voltage being supplied to the hard disk, the comparison circuit receives the sampled voltage, compares the sampled voltage to a reference voltage, and controls the switch circuit to be turned on or off accordingly. The relay circuit is connected between a system power supply and an enable terminal of the comparison circuit. The relay circuit outputs a high level signal to turn on the switch circuit when the system power supply is being supplied and the hard disk power supply is not being supplied to the hard disk.

8 Claims, 2 Drawing Sheets

PROTECTION CIRCUIT FOR HARD DISK

BACKGROUND

1. Technical Field

The present disclosure relates to a protection circuit for hard disks.

2. Description of Related Art

If a voltage supplied to a hard disk is too high, the hard disk may be damaged.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
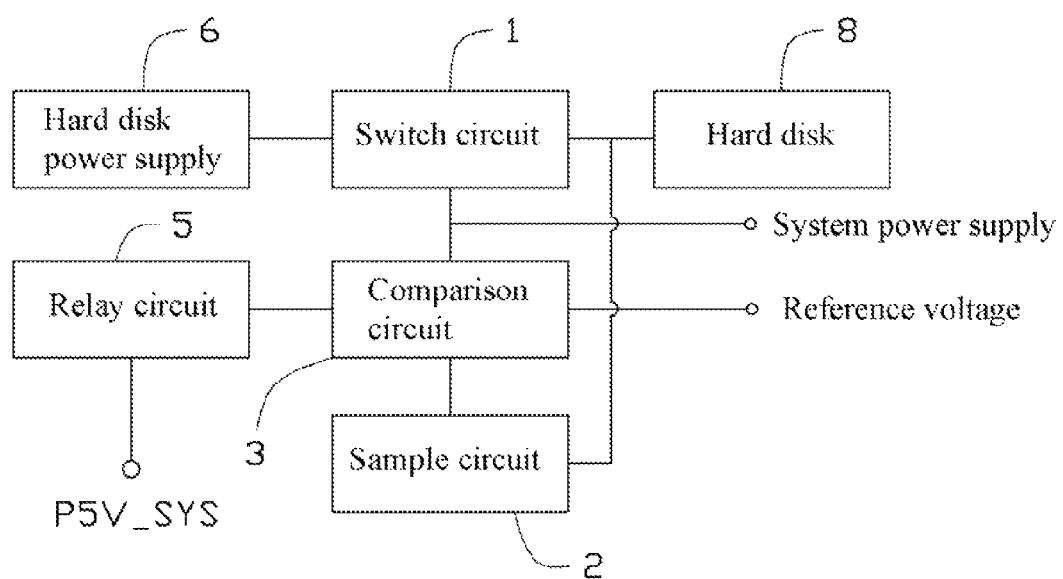
FIG. 1 is a block diagram of an exemplary embodiment of a protection circuit for a hard disk.

Referring to FIG. 1, an exemplary embodiment of a protection circuit for a hard disk 8 includes a switch circuit 1, a sample circuit 2, a comparison circuit 3, and a relay circuit 5.

A first end of the switch circuit 1 is connected to a hard disk power supply 6. A second end of the switch circuit 1 is connected to the hard disk 8. The switch circuit 1 controls whether the hard disk power supply 6 outputs power to the hard disk 8. The sample circuit 2 is connected to the second end of the switch circuit 1 to sample the voltage output from the hard disk power supply 6 to the hard disk 8, and transmits the result of the voltage sample to the comparison circuit 3. The comparison circuit 3 is further connected to a reference voltage and a system power supply. The switch circuit 1 is further connected to the system power supply.

The comparison circuit 3 compares the sampled voltage with a reference voltage and controls the switch circuit 1 according to the comparison. The relay circuit 5 is connected to the comparison circuit 3 to put the comparison circuit 2 in a high-impedance state, such that the switch circuit 1 is turned on for supplying power to the hard disk 8.

Figure 2:
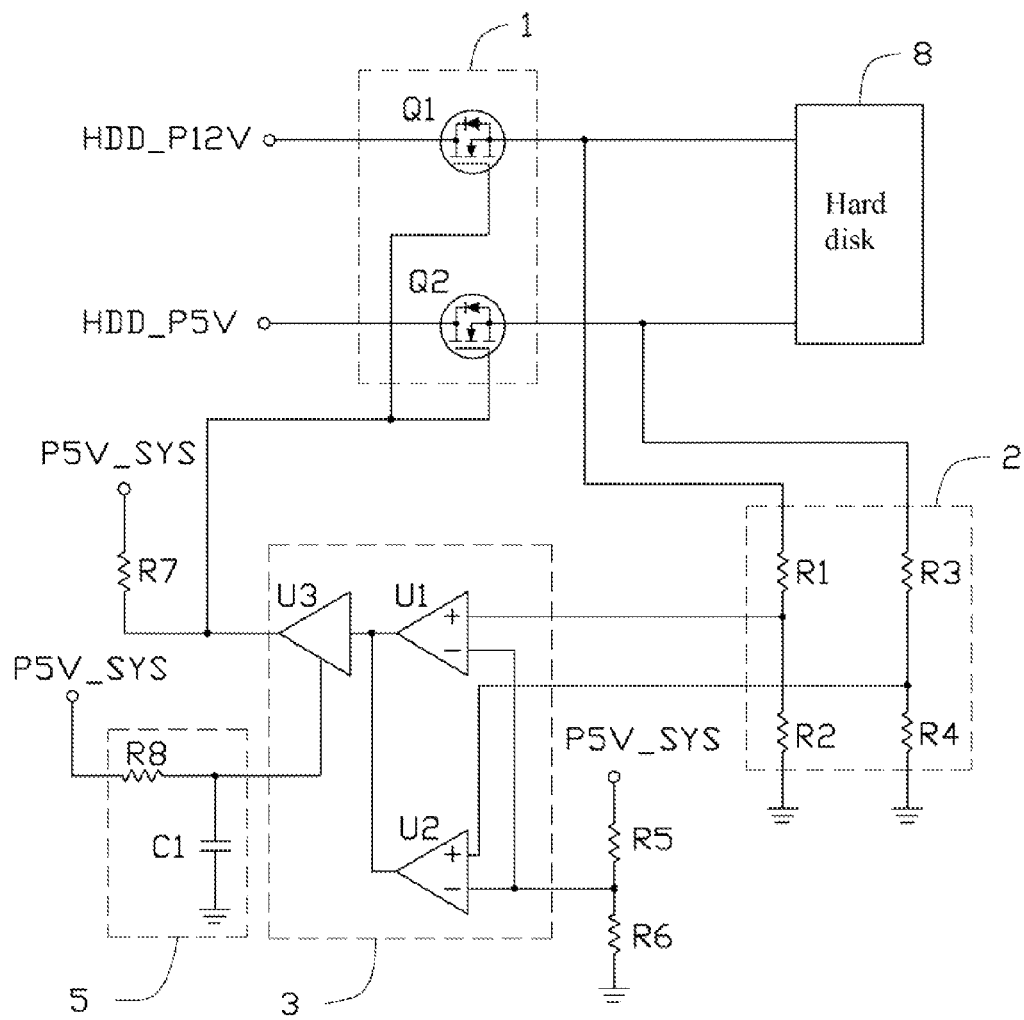
FIG. 2 is a circuit diagram of the protection circuit of FIG. 1.

Referring to FIG. 2, the switch circuit 1 includes two N type field effect transistors (FETs) Q1 and Q2. A drain of the FET Q1 is connected to a first power supply HDD_P12V. A source of the FET Q1 is connected to the hard disk 8. A drain of the FET Q2 is connected to a second power supply HDD_P5V. A source of the FET Q2 is connected to the hard disk 8.

The sample circuit 2 includes four resistors R1-R4. A first terminal of the resistor R1 is connected to the source of the FET Q1. A second terminal of the resistor R1 is connected to ground through the resistor R2. A first terminal of the resistor R3 is connected to the source of the FET Q2. A second terminal of the resistor R3 is connected to ground through the resistor R4.

The comparison circuit 3 includes two comparators U1, U2, and a three-state buffer U3. A positive input of the comparator U1 is connected to a node between the two resistors R1 and R2. A positive input of the comparator U2 is connected to a node between the two resistors R3 and R4. The negative inputs of the comparators U1 and U2 are connected to a reference voltage. In the embodiment, the reference voltage is provided by a system power supply P5V_SYS divided by two resistors R5 and R6. A first terminal of the resistor R5 is connected to the system power supply P5V_SYS. A second terminal of the resistor R5 is grounded through the resistor R6. The negative inputs of the comparators U1 and U2 are connected to a node between the resistors R5 and R6. The outputs of the comparators U1 and U2 are connected to an input of the three-state buffer U3. An output of the three-state buffer U3 is connected to the gates of the FETs Q1 and Q2, and is further connected to the system power supply P5V_SYS through a resistor R7.

The relay circuit 5 includes a resistor R8 and a capacitor C1. An enable terminal of the three-state buffer U3 is connected to the system power supply P5V_SYS through the resistor R8, and is further grounded through the capacitor C1.

The sample circuit 2 samples voltages at the sources of the FETs Q1 and Q2, and transmits the voltage levels to the comparators U1 and U2. The comparators U1 and U2 compare the voltage levels sampled to the reference voltage. When one of the comparators U1 and U2 outputs a low level signal, the three-state buffer U3 outputs a low level signal. The FETs Q1 and Q2 are turned off. When each of the comparators U1 and U2 outputs a high level signal, the three-state buffer U3 outputs a high level signal. The FETs Q1 and Q2 are turned on. At this time, the first power supply HDD_P12V and the second power supply HDD_P5V supply power to the hard disk 8.

When a computer system is powered on, the computer system outputs the system power supply P5V_SYS before the first and second power supplies HDD_P_12V and HDD_P5V are output. When the computer system is not outputting both of the first and second power supplies HDD P_12V and HDD_P5V, each of the positive inputs of the comparators U1 and U2 receives a low level signal. Each of the comparators U1 and U2 thus output a low level signal. The input of the three-state buffer U3 receives a low level signal. At this time, the system power supply P5V_SYS is charging the capacitor C1. The enable terminal of the three-state buffer U3 receives a low level signal. Characteristically, the three-state buffer U3 is in a high-impedance state. As a result, each of the bases of the FETs Q1 and Q2 receives a high level signal. The FETs Q1 and Q2 are turned on. As a result, at the moment that the computer system outputs the first and second power supplies HDD P_12V and HDD_P5V, the FETs Q1 and Q2 transmit the first and second power supplies HDD_P12V and HDD_P5V to the hard disk 8. After the first and second power supplies HDD_P12V and HDD_P5V power the hard disk 8, the sample circuit 2 samples the voltage output to the hard disk 8 and transmits the sampled voltage to the comparison circuit 3.

When the capacitor C1 is fully charged, the enable terminal of the three-state buffer U3 receives a high level signal. At this time, when the input of the three-state buffer U3 receives a low level signal, the output of the three-state buffer U3 outputs a low level signal. When the input of the three-state buffer U3 receives a high level signal, the output of the three-state buffer U3 outputs a high level signal.

In the embodiment, the FETs Q1 and Q2 function as electronic switches. Therefore, the FETs Q1 and Q2 can be replaced by any other electronic switches.

The foregoing description of the exemplary embodiments of the disclosure has been presented only for the purposes of illustration and description and is not intended to be exhaustive or to limit the disclosure to the precise forms disclosed. Many modifications and variations are possible. The embodiments were chosen and described in order to explain the principles of the disclosure and their practical application so as to enable others of ordinary skill in the art to utilize the disclosure and various embodiments and with such modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A protection circuit for hard disks, the protection circuit comprising:
    a switch circuit connected between a hard disk power supply and a hard disk to control whether to output power from the hard disk power supply to the hard disk;
    a sample circuit to sample a voltage being supplied to the hard disk;
    a comparison circuit to receive the sampled voltage, compare the sampled voltage to a reference voltage, and control the switch circuit to be turned on or off accordingly; and
    a relay circuit connected between a system power supply and an enable terminal of the comparison circuit, wherein the relay circuit outputs a high level signal to turn on the switch circuit when the system power supply is supplying power and the hard disk power supply is not supplying power.

2. The protection circuit of claim 1, wherein the switch circuit comprises a first electronic switch and a second electronic switch, the hard disk power supply comprises a first power supply connected to a first terminal of the first electronic switch and a second power supply connected to a first terminal of the second electronic switch, second terminals of the first and second electronic switches are connected to the hard disk, control terminals of the first and second electronic switches are connected to the comparison circuit.

3. The protection circuit of claim 2, wherein the sample circuit comprises first to fourth resistors, a first terminal of the first resistor is connected to the second terminal of the first electronic switch, a second terminal of the first resistor is grounded through the second resistor, a node between the first and second resistors is connected to the comparison circuit, a first terminal of the third resistor is connected to the second terminal of the second electronic switch, a second terminal of the third resistor is grounded through the fourth resistor, a node between the third and fourth resistors is connected to the comparison circuit.

4. The protection circuit of claim 3, wherein the comparison circuit comprises first and second comparators, a three-state buffer, a positive input of the first comparator is connected to the node between the first and second resistors, a positive input of the second comparator is connected to the node between the third and fourth resistors, negative inputs of the first and second comparators are connected to receive the reference voltage, outputs of the first and second comparators are connected to an input of the three-state buffer, an output of the three-state buffer is connected to the control terminals of the first and second electronic switches, the output of the three-state buffer is further connected to the system power supply, an enable terminal of the three-state buffer is connected to the relay circuit.

5. The protection circuit of claim 4, wherein the reference voltage is provided by the system power supply divided by fifth and sixth resistors, the system power supply is grounded through the fifth and sixth resistors, the negative inputs of the first and second comparators are connected to a node between the fifth and sixth resistors.

6. The protection circuit of claim 4, wherein the relay circuit comprises a seventh resistor and a capacitor, the system power supply is connected to the enable terminal of the three-state buffer through the seventh resistor, the enable terminal of the three-state buffer is further grounded through the capacitor.

7. The protection circuit of claim 1, wherein the first electronic switch is a field effect transistor, a drain of the field effect transistor is the first terminal of the first electronic switch, a source of the field effect transistor is the second terminal of the first electronic switch, a gate of the field effect transistor is the control terminal of the first electronic switch.

8. The protection circuit of claim 1, wherein the second electronic switch is a field effect transistor, a drain of the field effect transistor is the first terminal of the second electronic switch, a source of the field effect transistor is the second terminal of the second electronic switch, a gate of the field effect transistor is the control terminal of the second electronic switch.

* * * * *